(12) United States Patent
Bernklau

(10) Patent No.: US 11,975,825 B2
(45) Date of Patent: May 7, 2024

(54) SPLINE WITH EXPENDABLE SPHERICAL ALIGNMENT HEAD

(71) Applicant: Bell Textron Inc., Fort Worth, TX (US)

(72) Inventor: Nathaniel Ross Bernklau, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 444 days.

(21) Appl. No.: 17/101,688

(22) Filed: Nov. 23, 2020

(65) Prior Publication Data
US 2022/0161925 A1    May 26, 2022

(51) Int. Cl.
| | |
|---|---|
| B64C 27/14 | (2006.01) |
| B64C 1/06 | (2006.01) |
| B64D 27/02 | (2006.01) |
| F16C 3/02 | (2006.01) |
| F16D 3/06 | (2006.01) |
| F16D 1/10 | (2006.01) |

(52) U.S. Cl.
CPC .............. *B64C 27/14* (2013.01); *B64C 1/061* (2013.01); *B64D 27/02* (2013.01); *F16C 3/02* (2013.01); *F16C 3/023* (2013.01); *F16D 3/06* (2013.01); *F16C 2223/30* (2013.01); *F16C 2326/43* (2013.01); *F16D 2001/103* (2013.01); *F16D 2200/0052* (2013.01); *F16D 2250/0046* (2013.01); *Y10T 403/7032* (2015.01)

(58) Field of Classification Search
CPC ......... B64C 27/14; B64C 1/061; B64D 27/02; F16C 3/02; F16C 2223/30; F16C 2326/43; F16D 3/06; F16D 2250/0046; F16D 2001/103; F16D 2200/0052; Y10T 403/7032

USPC ...................................................... 403/359.4
See application file for complete search history.

(56) References Cited

U.S. PATENT DOCUMENTS

| | | | |
|---|---|---|---|
| 2,480,866 A | 9/1949 | Lusk | |
| 2,565,776 A | 8/1951 | Monroe | |
| 3,016,721 A | 1/1962 | Davis | |
| 3,301,008 A * | 1/1967 | Beinke | ................ F16C 11/0628 |
| 3,304,745 A | 2/1967 | King et al. | |
| 4,464,141 A * | 8/1984 | Brown | .................... F16D 3/185 |
| 4,634,296 A | 1/1987 | Watanabe | |
| 4,795,310 A | 1/1989 | McArdle et al. | |
| 4,797,021 A | 1/1989 | Stamper | |

(Continued)

FOREIGN PATENT DOCUMENTS

| | | | | |
|---|---|---|---|---|
| DE | 30 02 143 A1 * | 7/1981 | ................ | 403/359.5 |
| JP | 1-279120 A * | 11/1989 | ................ | 403/359.6 |
| JP | 1-279120 A * | 11/1989 | ................ | 403/359.6 |

OTHER PUBLICATIONS

Universal Joint and Driveshaft Design Manual, AE-7, Society of Automotive Engineers, Inc., Warrendal, PA, Chapter 14, pp. 311-319, TJ1079.S62. (Year: 1979).*

*Primary Examiner* — Greg Binda
(74) *Attorney, Agent, or Firm* — Akona IP PC

(57) ABSTRACT

A spline assembly, including a spline shaft having a first end and a second end, wherein the first end is splined to engage a spline receiver of a primary drive system and includes a substantially spherical alignment head, wherein the spherical alignment head comprises an expendable hydrocarbon material that is caused to melt by operation of the primary drive system over time.

11 Claims, 7 Drawing Sheets

(56) References Cited

U.S. PATENT DOCUMENTS

| | | |
|---|---|---|
| 5,207,132 A * | 5/1993 | Goss .................... B25B 15/005 |
| 5,360,376 A | 11/1994 | Baldino |
| 5,672,112 A | 9/1997 | Sbabo |
| 6,050,521 A | 4/2000 | Regonini |
| 6,482,094 B2 | 11/2002 | Kefes |
| 6,510,756 B2 | 1/2003 | Aota |
| 7,326,036 B1 | 2/2008 | Habin et al. |
| 7,631,737 B2 | 12/2009 | Louis et al. |
| 7,731,467 B2 | 6/2010 | Babej |
| 8,033,917 B2 | 10/2011 | Prill et al. |
| 8,377,102 B2 | 2/2013 | Jackson |
| 10,421,537 B2 | 9/2019 | Wolcott et al. |

* cited by examiner

SPLINE WITH EXPENDABLE SPHERICAL ALIGNMENT HEAD

TECHNICAL FIELD

This disclosure relates generally to aircraft devices and, more particularly, to a system and method of providing a spline assembly with a spherical alignment terminal.

SUMMARY

In an example, there is disclosed a spline assembly, comprising: a spline shaft having a first end and a second end, wherein the first end is splined to engage a spline receiver of a primary drive system and comprises a substantially spherical alignment head.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1:
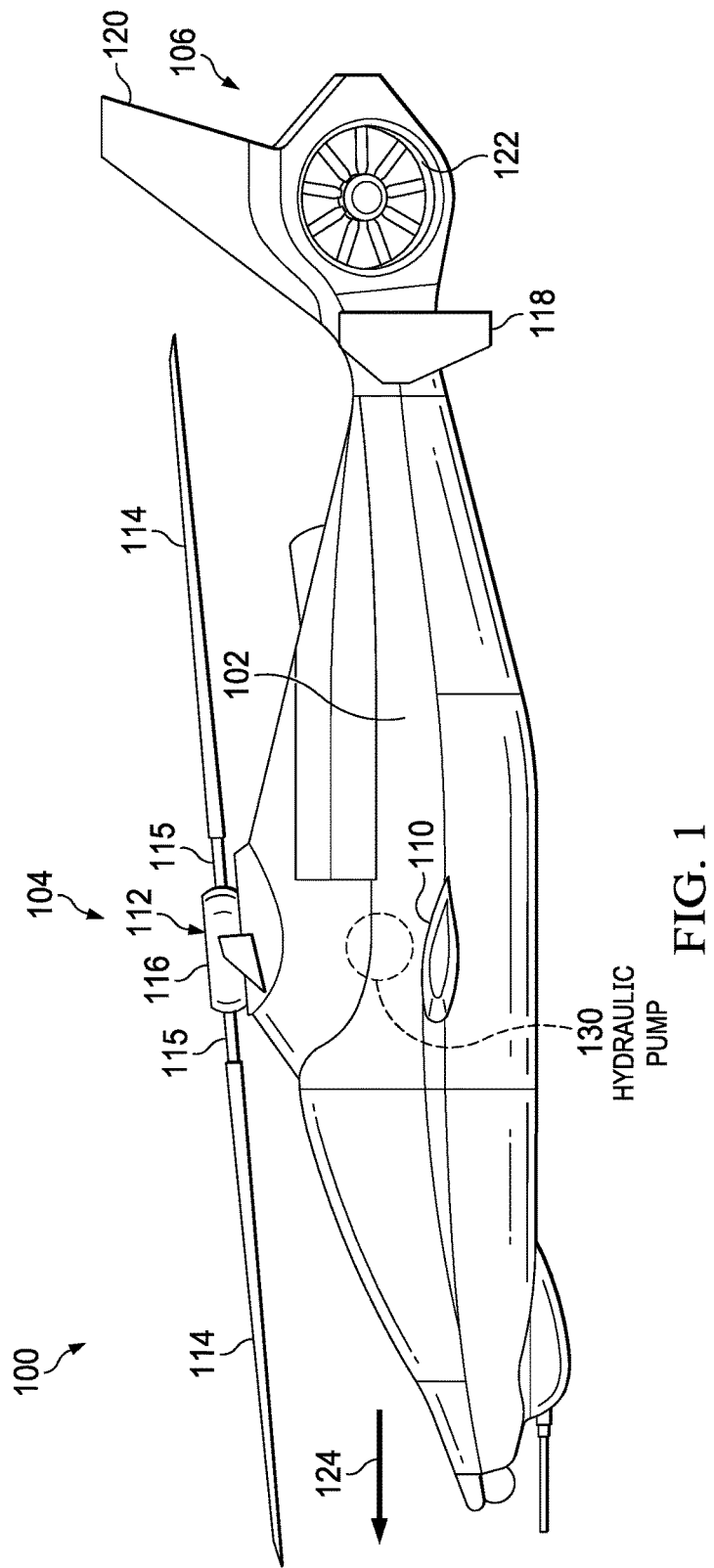
FIG. 1 illustrates a side view of an example aircraft in accordance with certain embodiments of the present disclosure.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," "top," "bottom" or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, as referred to herein in this specification, the terms "forward," "aft," "inboard," and "outboard" may be used to describe relative relationship(s) between components and/or spatial orientation of aspect(s) of a component or components. The term "forward" may refer to a special direction that is closer to a front of an aircraft relative to another component or component aspect(s). The term "aft" may refer to a special direction that is closer to a rear of an aircraft relative to another component or component aspect (s). The term "inboard" may refer to a location of a component that is within the fuselage of an aircraft and/or a spatial direction that is closer to or along a centerline of the aircraft relative to another component or component aspect (s), wherein the centerline runs in a between the front and the rear of the aircraft. The term "outboard" may refer to a location of a component that is outside the fuselage—of an aircraft and/or a special direction that farther from the centerline of the aircraft relative to another component or component aspect(s).

Still further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

The present specification describes a spline with a spline shaft, and a spherical alignment terminal to aid in aligning the spline with a spline receiver on a gear that receives the spline. In this example, the gear is a primary drive train in a primary-secondary system, and the drive train of the hydraulic pump is the secondary drive train. The spline shaft may be hollow, which allows for a lighter construction to save weight in an aircraft. A use case is presented in particular in a rotary aircraft such as a helicopter, which may be, for example, an attack helicopter. In this use case, the rotary aircraft includes a main drive driven, for example, by the main engine. The main drive drives the main rotor of the rotary aircraft, and also drives auxiliary systems, such as, for example, a fuel pump or a hydraulic pump. In an illustrative example, design considerations place the hydraulic pump within or near a gearbox. This hydraulic pump is separated from a gear that engages the primary drive system by a distance of approximately 13 to 14 inches.

The hydraulic pump in this example mechanically couples to the gear at the opposite end via a shaft, which includes a spline on at least the end of the shaft. The spline engages a spline receiver at the gear, and thus permits the gear to turn the hydraulic pump, which may distribute, for example, lubricant or other fluid. Because of the distance between the hydraulic pump and the gear, it may be difficult to insert the spline shaft, either in initial assembly, or during servicing of the aircraft.

In an illustrative embodiment, a spherical ball terminal is placed on the end of the spline shaft. Furthermore, the spline receiver may have a slightly flared end. This makes it easier to mate the spline shaft to the spline receiver. The slightly flared terminal of the spline receiver catches the ball terminal on the spline shaft, and allows the spline shaft to then engage the spline receiver of the gear. Not only does this make assembly easier, but it also helps to prevent damage that may be caused by trying to align the spline with the spline receiver. Furthermore, this may obviate the need for special tools to perform the spline alignment. The ball terminal may also serve as a piloting feature, allowing for a more precise fitting of "side fit" splines.

In various embodiments, the ball terminal may be of different compositions. For example, the spline shaft itself may be of a sturdy steel construction using, for example, common aircraft grade steel. The ball terminal could be of the same material as the spline shaft. However, it need not be of the same material. In some cases, it may be advantageous to make the ball shaft of a different material, including of a wear material or of a disposable material. For example, the ball terminal could be aluminum, or it could be a powdered or porous metal, or could be a wear part or made of a wear material. In other examples, the spline and/or the ball terminal could be coated with an advanced coating, such as a nano wear coating. In yet another embodiment, the ball terminal could be made of a hydrocarbon, such as a wax or oil material designed to melt when the engine is run. In this case, the ball terminal may mix with the lubricant fluid, and may simply be removed at the next oil change. Indeed, after initial assembly, the engine may be taken through a shakedown or test run, and the oil may be changed immediately thereafter. Advantageously, not only does this remove the alignment ball, but also removes the additional weight of the ball terminal. This is beneficial, because in military applications, such as in an attack helicopter, any extra weight carries a corresponding decrease in performance.

Referring to FIG. 1, illustrated therein is an example embodiment of an aircraft, which in the illustrated example is a rotorcraft 100. FIG. 1 portrays a side view of rotorcraft 100, which includes a fuselage 102, a primary rotor system 104, and an empennage 106. The fuselage 102 is the main body of the rotorcraft 100, which may include a cabin (e.g., for crew, passengers, and/or cargo) and/or may house certain mechanical components, electrical components, etc. (e.g., engine(s), transmission, flight controls, etc.). In accordance with features of embodiments described herein, an approximate location of a hydraulic pump is designated as 130. In some embodiments, hydraulic pump 130 may be located within or near a gearbox, and particularly in a forward position of the gearbox. Fuselage 102 also includes a payload bay covered by a payload bay door disposed under a wing 110, which in some embodiments includes a support structure and actuation mechanism for extending externally stowed payload (e.g., weapons) outboard away from the fuselage 102 to a firing position. It will be recognized that, although not shown in the view illustrated in FIG. 1, the opposite side of the rotorcraft 100 also includes a wing and a payload bay door corresponding to the wing 110 and payload bay door.

The rotor system 104 is used to generate lift for rotorcraft 100. For example, the rotor system 104 (also generally referred to as the "rotor") may include a rotor hub 112 (also referred to as a "rotor hub assembly" or more generally as a "hub") coupled to a plurality of rotor blades 114 (also referred to generally as "blades"). Torque generated by the engine(s) causes the rotor blades 114 to rotate, which generates lift. The empennage 106 of the rotorcraft 100 includes a horizontal stabilizer 118, a vertical stabilizer 120, and a tail rotor or anti-torque system 122. Although not shown in the view illustrated in FIG. 1, a corresponding horizontal stabilizer is disposed on the other side of the rotorcraft 100 opposite the horizontal stabilizer 118. The horizontal stabilizer 118 and vertical stabilizer 120 respectively provide horizontal and vertical stability for the rotorcraft 100. Moreover, tail rotor or anti-torque system 122 may be used to provide anti-torque and/or direction control for the rotorcraft 100.

Rotorcraft 100 relies on rotor system 104 for flight capabilities, such as controlling (e.g., managing and/or adjusting) flight direction, thrust, and lift of the rotorcraft. For example, the pitch of each rotor blade 114 can be controlled using collective control or cyclic control to selectively control direction, thrust, and lift of the rotorcraft 100. During collective control, all the of rotor blades 114 are collectively pitched together (e.g., the pitch angle is the same for all blades), which effects overall thrust and lift. During cyclic control, the pitch angle of each of the rotor blades 114 varies depending on where each blade is within a cycle of rotation (e.g., at some points in the rotation the pitch angle is not the same for all blades), which can affect direction of travel of the rotorcraft 100.

Aircraft such as rotorcraft 100 can be subjected to various aerodynamic and operational forces during operation, such as lift, drag, centrifugal force, aerodynamic shears, and so forth. Lift and centrifugal force, for example, are forces produced by the rotation of a rotor system. Lift is an upward force that allows a rotorcraft to elevate, while centrifugal force is a lateral force that tends to pull the rotor blades outward from the rotor hub. These forces can subject the rotor hub, rotor yoke, and/or the rotor blades (referred to herein using the terms "hub/blades," "yoke/blades," "hub/yoke/blades," and variations thereof) to flapping, leading and lagging, and/or bending. For example, flapping is a result of the dissymmetry of lift produced by rotor blades at different positions (typically referred to as "pitch" or "pitch angles") during a single rotation. During rotation, for example, a rotor blade may generate more lift while advancing in the direction of travel of the rotorcraft than while retreating in the opposite direction. A rotor blade may be flapped up (also sometimes referred to as being pitched "nose-up") while advancing in the direction of travel, and may flap down (e.g., pitched "nose-down") while retreating in the opposite direction. When a blade is pitched more nose-up, more lift is created on that blade, which will drag the side of the rotor/hub upward, which makes the hub/yoke flap. For example, for rotorcraft 100, the most aft blade (e.g., nearest to tail rotor or anti-torque system 122) of the rotor system 104 may be pitched more nose-up and the most forward blade may be pitched more nose-down; to provide a forward direction of travel (as generally indicated by arrow 124) for rotorcraft 100.

Figure 2:
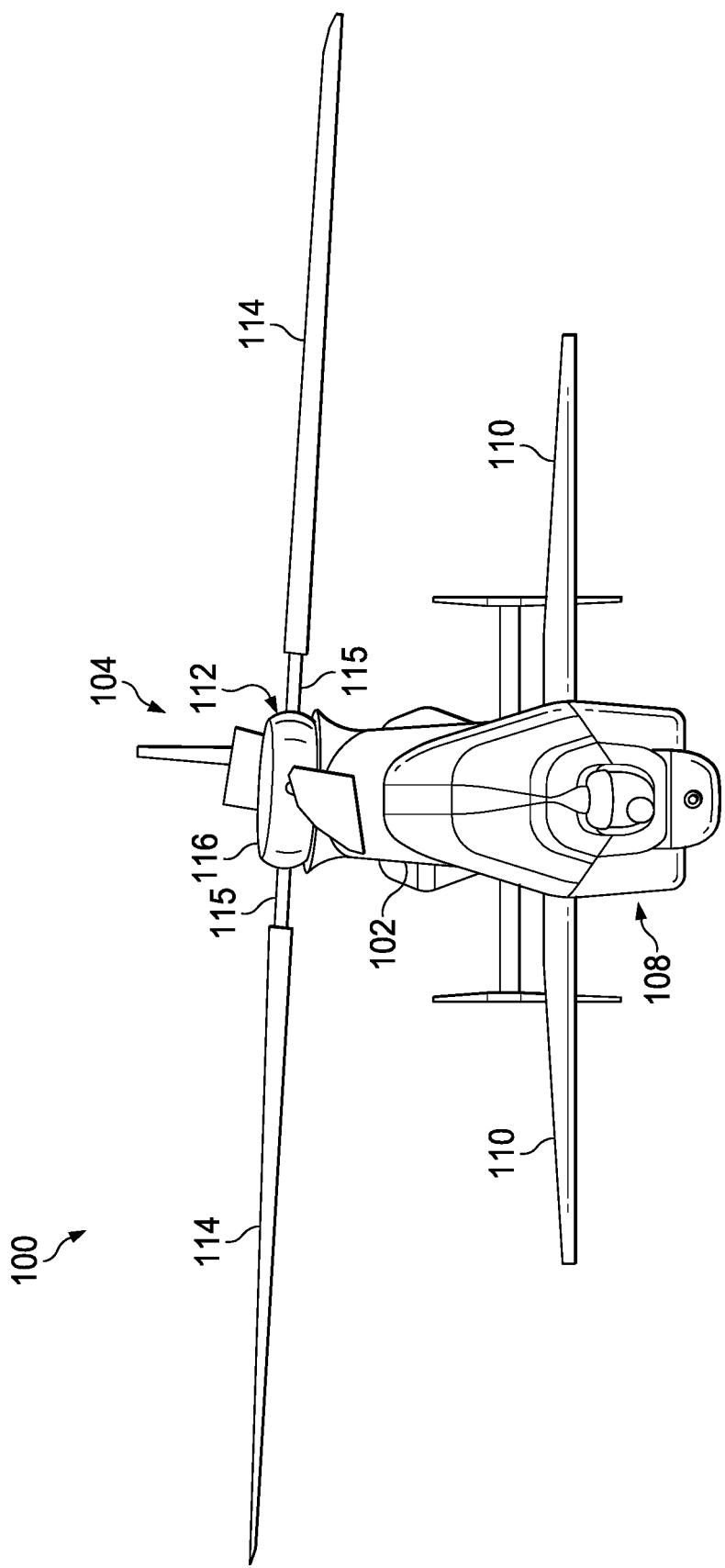
FIG. 2 illustrates a front plan view of the aircraft of FIG. 1.

Referring now to FIG. 2, illustrated therein is a front plan view of rotorcraft 100 of FIG. 1. FIG. 2 illustrates rotorcraft 100 with payload bay doors 108 closed, wherein a payload is stowed within respective payload bays.

Figure 3:
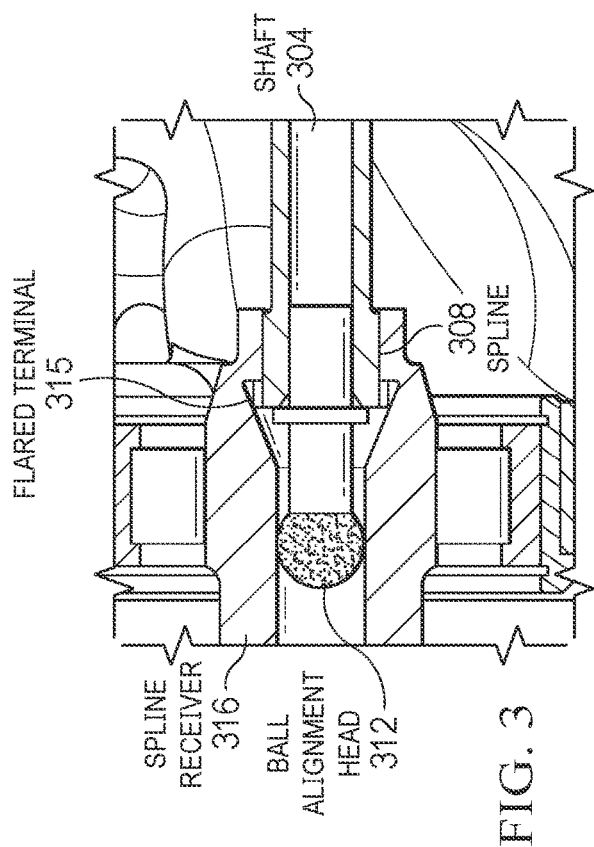
FIG. 3 is a cutaway side view illustrating a detail of a spline shaft.

FIG. 3 is a cutaway side view illustrating a detail of a spline shaft. In this case, a spline receiver 316 is configured to mechanically receive a spline shaft 304. Spline members 308 engage spline receiver 316, and impart rotational motion from spline receiver 316 into spline shaft 304. In this case, there is illustrated a slightly flared terminal 315 of spline receiver 316. Flared terminal 315 mechanically receives ball alignment head 312, which is disposed on the end of spline shaft 304 and may be a sphere or a truncated sphere. Ball alignment head 312 can couple to flared terminal 315, advantageously without damage, and more easily than if spline shaft 304 and spline receiver 316 were simply straight, columnar splines.

In this illustration, as discussed above, spline shaft 304 may be hollow. This may reduce the weight of spline shaft 304, which is important in many aerospace applications, and in particular in a highly mass-sensitive application such as an attack helicopter.

Figure 4:
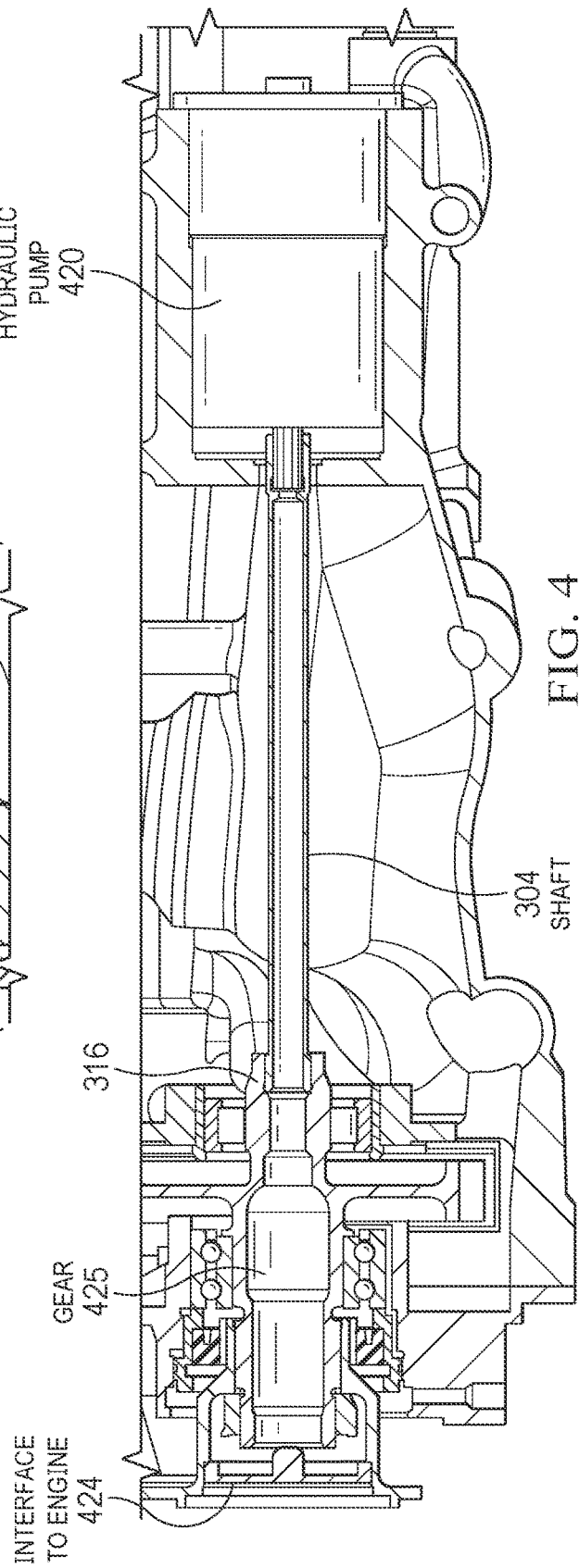
FIG. 4 is a larger cutaway view of the system of the present disclosure.

FIG. 4 is a larger cutaway view of the system of the present disclosure. In the illustration of FIG. 4, spline shaft 304 may or may not have a ball alignment head 312. In this case, spline shaft 304 is illustrated already engaged to spline receiver 316. Spline receiver 316 mechanically couples to a gear 425, which then has an interface to the engine 424. Thus, the primary engine may impart rotary motion to gear 425. Gear 425, via the splines, may impart rotary motion to spline shaft 304, which then imparts rotary motion to hydraulic pump 420, which operates hydraulic pump 420.

In this example, spline shaft 304 may be approximately 13 to 14 inches long, which may make it difficult to mate spline shaft 304 to spline receiver 316 without the aid of ball alignment head 312. When hydraulic pump 420 is installed, shaft 304 and spline receiver 316 are not visible. Clocking rotations of pump 420 may be required to align the splines. This may be difficult without the aid of, for example, a ball terminal or similar feature. Further advantageously, flared terminal 315 of spline receiver 316 both allows some "play" in the tolerances, and permits flexion of spline shaft 304 during operation. This can help to prevent binding, and can help to ensure smooth and successful operation of the aircraft.

In this illustration, hydraulic pump 420 may be located within a gearbox of the rotary aircraft, and in particular near a forward section of the gearbox. Furthermore, it should be understood that gear 425 may engage the primary drive train of the rotary aircraft, and thus receive rotary motion via the main engine. Alternatively, gear 425 could engage another power source, such as an auxiliary power unit, and could receive rotary motion therefrom.

Figure 5:
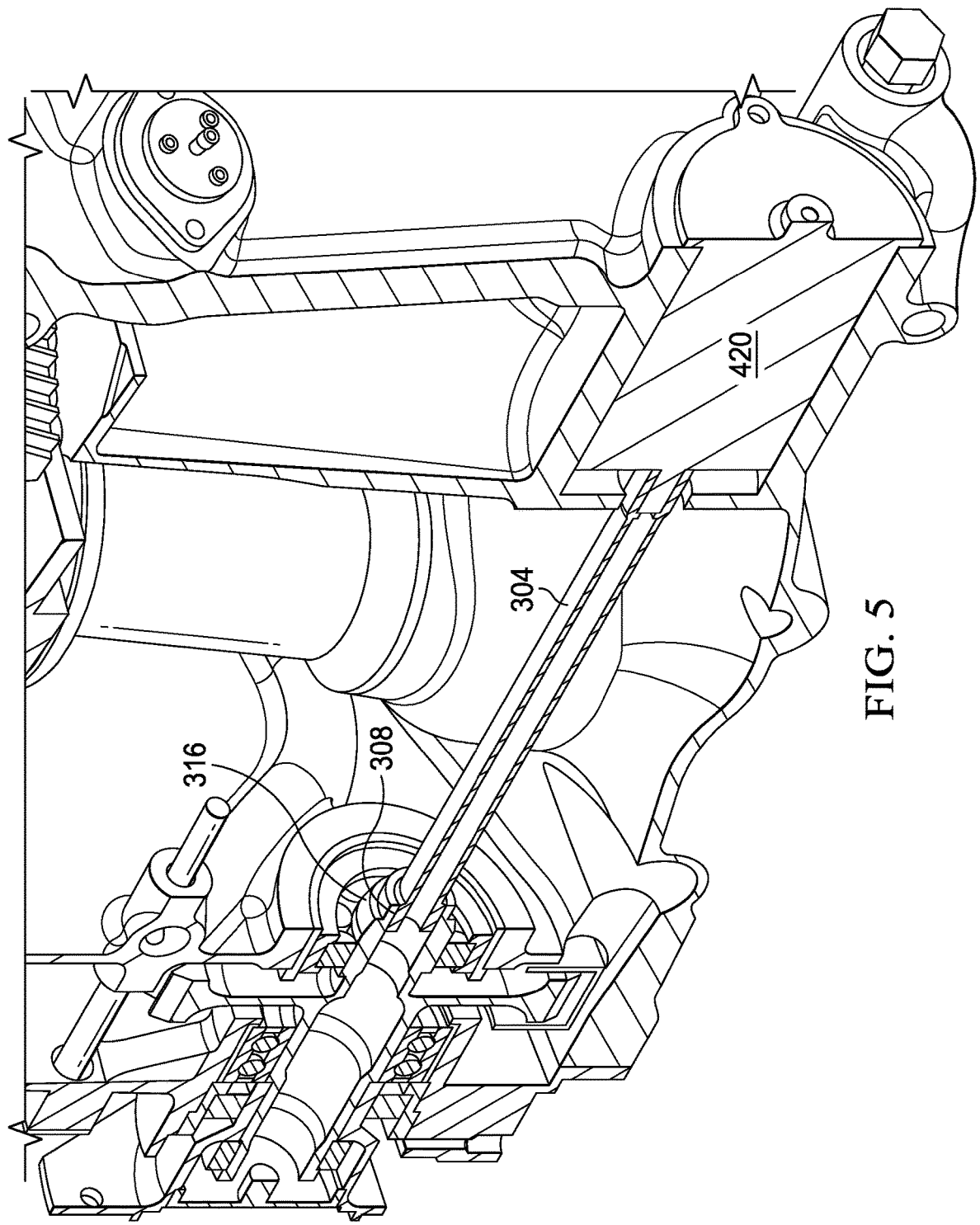
FIG. 5 is an additional cutaway perspective view illustrating aspects of the present disclosure.

FIG. 5 is an additional cutaway perspective view illustrating aspects of the present disclosure. Visible in this FIGURE are hydraulic pump 420, spline shaft 304, spline receiver 316, and spline 308. Here, it is illustrated that spline shaft 304 and spline receiver 316 may be mated successfully. As described above, ball alignment head 312 may aid in the successful alignment. Furthermore, as described above, in some embodiments ball alignment head 312 may be made of a disposable material, and in particular of a hydrocarbon that may mix with the hydraulic fluid, and may be disposed of in an oil change. This can eliminate the extra weight of the ball alignment head, and may also reduce its initial weight. In some embodiments, ball alignment head 312 does not serve any mechanical purpose once spline shaft 304 has been successfully mated to spline receiver 316. In other embodiments, ball alignment head 312 may continue to be functional. For example, it may be useful if the sphere is being used as a piloting feature for side fit splines.

In embodiments where the sphere serves only as an aid for installation, ball alignment head 312 is essentially disposable. Thus, it is advantageous to have embodiments where the extra weight may be disposed of when it is unnecessary.

Figure 6:
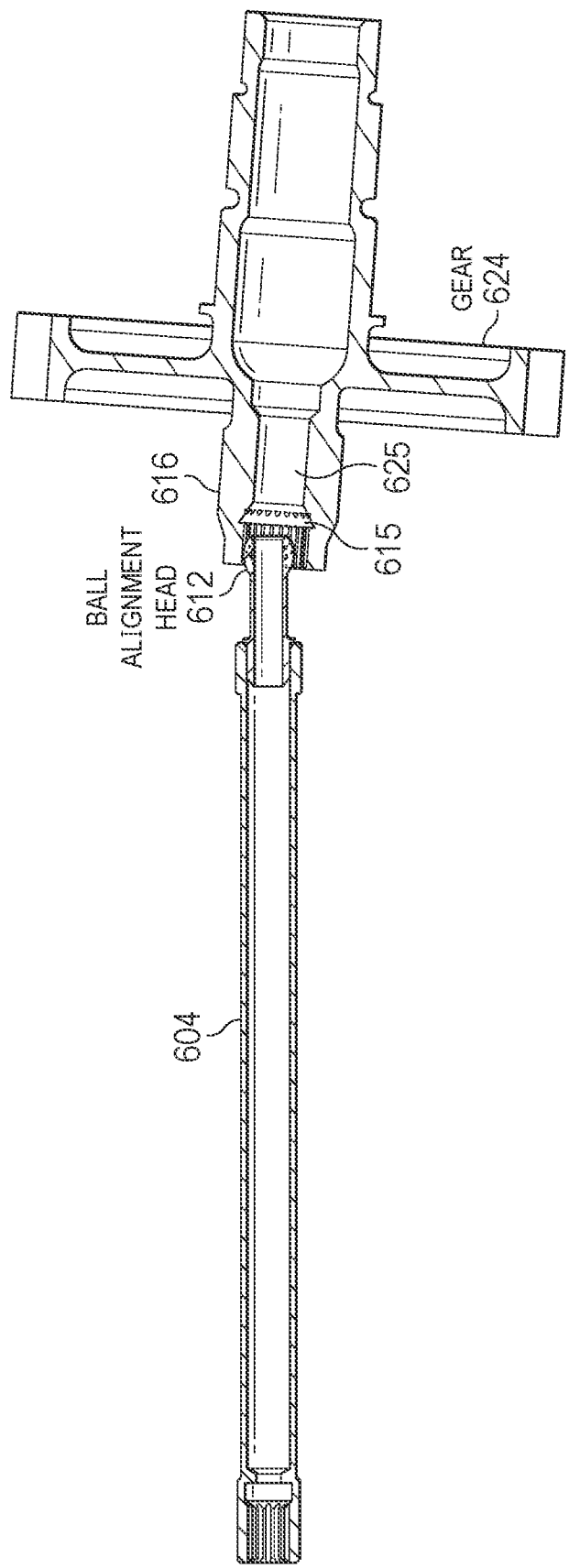
FIG. 6 is a further cutaway side view of aspects of the present disclosure.

FIG. 6 is a further cutaway side view of aspects of the present disclosure. In this illustration, a ball alignment head 612 is disposed at the end of a spline shaft 604. This allows alignment to a spline receiver 616, which engages a gear drive shaft 625. Gear drive shaft 625 then engages gear 624, which turns and imparts rotary motion to spline shaft 604. At a removed end from ball alignment head 612, spline shaft 604 may engage a second element, such as a hydraulic pump, or other mechanical element.

This example illustrates that the flared terminal 615 gives a little bit of play in the joint, which both allows for easier alignment of ball alignment head 612, and further allows for flexion of the spline shaft 604.

Figure 7:
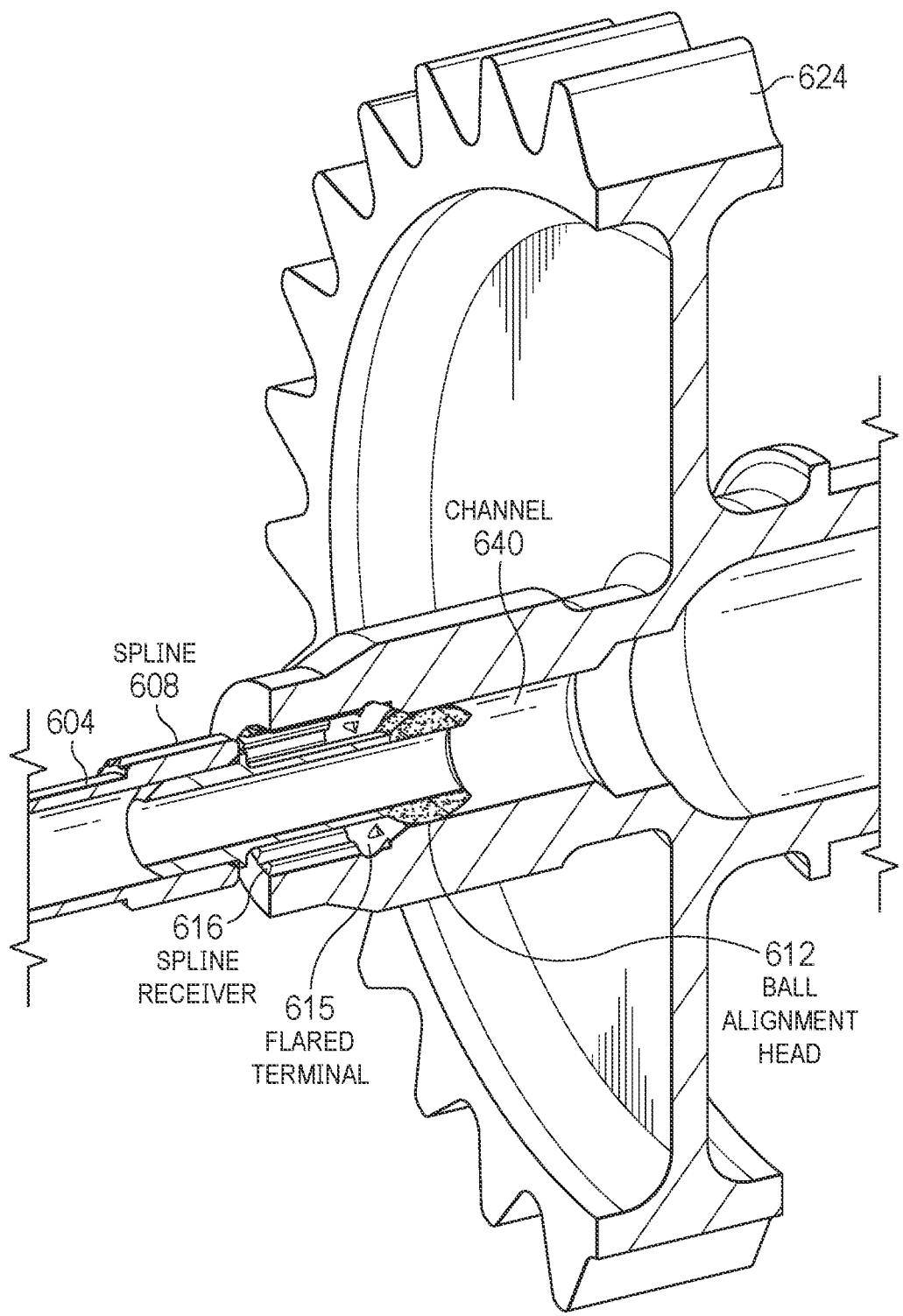
FIGS. 7-8 illustrate the mating of a ball alignment head into a flared terminal.
Figure 8:
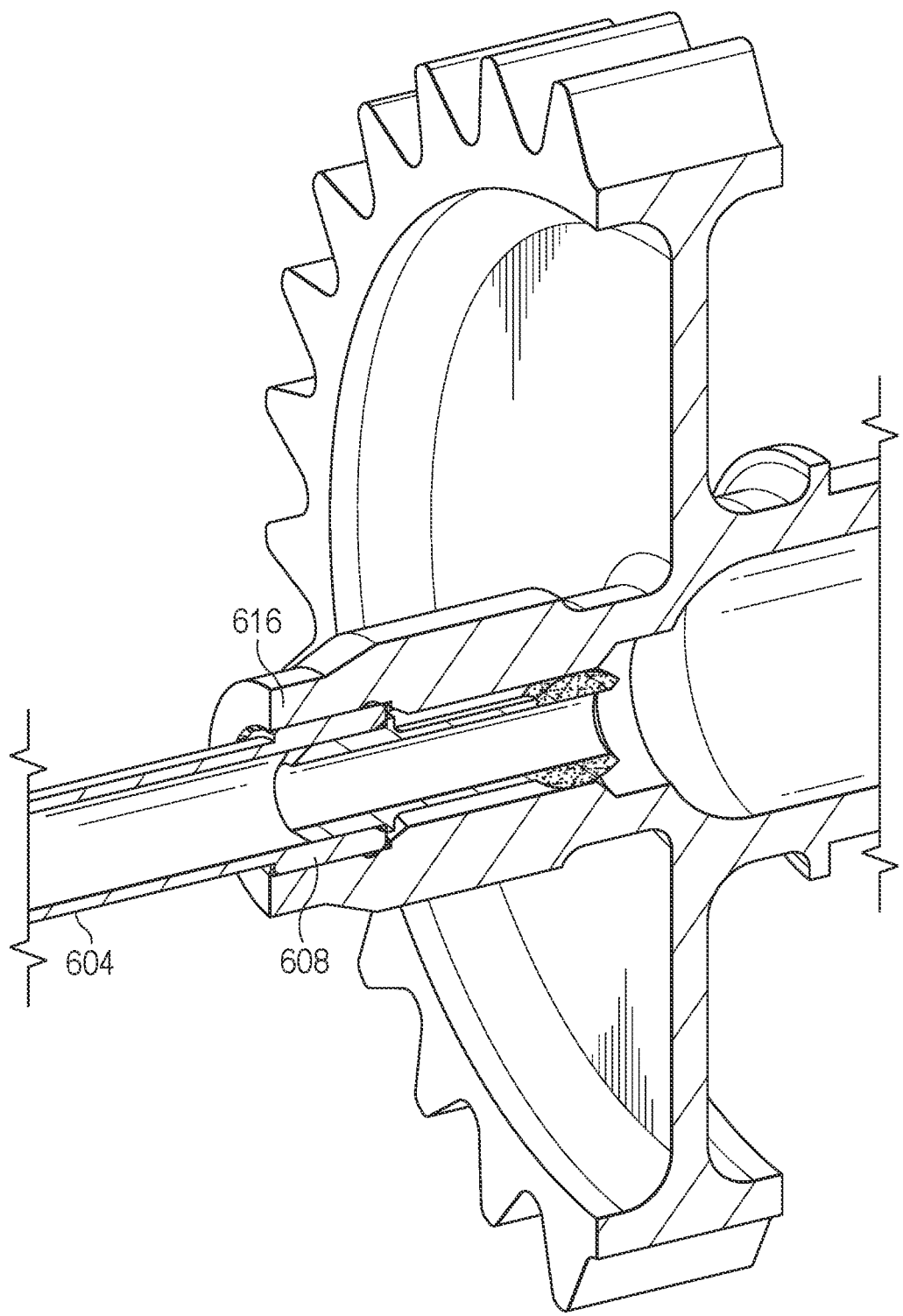

FIGS. 7-8 illustrate the mating of a ball alignment head 612 into a flared terminal 615. In FIG. 7, it is seen that ball alignment head 612 is dimensioned to pass through spline receiver 616, and then spline 608 is configured to engage spline receiver 616. Ball alignment head 612 may then engage with a channel 640, which receives ball alignment head 612, and allows some flexion of spline shaft 604. As ball alignment head 612 travels further down channel 640, spline 608 mates securely with spline receiver 616. This is illustrated in FIG. 8, where it is seen that spline 608 is fully engaged with spline receiver 616. Thus, when gear 624 turns, its rotary motion is imparted to spline shaft 604.

It should be noted that while this embodiment has been disclosed in connection with a rotary aircraft, applications of the ball alignment head on a spline shaft are not so limited. Indeed, such a ball alignment head on a spline shaft may find many uses and applications, and all such mechanical uses and applications are intended to be encompassed within the scope of the present specification.

Several illustrative embodiments are disclosed below.

Example 1 is a spline assembly comprising a spline shaft having a first end and a second end, wherein the first end is splined to engage a spline receiver of a primary drive system and comprises a substantially spherical alignment head.

Example 2 is a spline assembly, wherein the spline shaft is hollow.

Example 3 is a spline assembly, wherein the spline shaft is solid.

Example 4 is a spline assembly, wherein the spherical alignment head is truncated spherical.

Example 5 is a spline assembly, wherein the first end is mechanically configured to couple to a primary drive train of a primary-secondary drive system.

Example 6 is a spline assembly, wherein the primary drive train is a main drive train of a rotary aircraft.

Example 7 is a spline assembly, wherein the second end is mechanically configured to couple to a secondary drive train of a primary-secondary drive train system.

Example 8 is a spline assembly, wherein the secondary drive train is a drive train of a hydraulic pump for a rotary aircraft.

Example 9 is a spline assembly, wherein the spherical alignment head is dimensioned to pass through a spline receiver of a mating part.

Example 10 is a spline assembly, wherein the spline shaft has a longitudinal length of greater than about 8 inches.

Example 11 is a spline assembly, wherein the spline shaft has a longitudinal dimension between approximately 13-14 inches.

Example 12 is a spline assembly, wherein the spherical alignment head is discrete from the spline shaft.

Example 13 is a spline assembly, wherein the spherical alignment head is of a different material from the spline shaft.

Example 14 is a spline assembly, wherein the spherical alignment head is constructed of a wear material.

Example 15 is a spline assembly, wherein the spherical alignment head is disposable.

Example 16 is a vehicle drive system comprising a first drive assembly to mechanically couple to a primary drive train of the vehicle; a second drive assembly to drive an auxiliary system of the vehicle; and a shaft assembly to mechanically couple the first drive assembly to the second drive assembly, the shaft assembly comprising a ball terminal to mechanically couple a spline to a spline receiver of the first drive assembly, and a second terminal to mechanically couple to the second drive assembly.

Example 17 is a vehicle drive system, wherein the spline receiver has a mating aperture with a conical end.

Example 18 is a vehicle drive system, wherein the conical end is dimensioned to allow flexion of the shaft assembly.

Example 19 is a vehicle drive system, wherein the auxiliary system is a hydraulic pump.

Example 20 is a vehicle drive system, wherein the first drive assembly includes a gear assembly.

Example 21 is a vehicle drive system, wherein the shaft assembly includes a hollow spline shaft.

Example 22 is a vehicle drive system, wherein the shaft assembly includes a solid spline shaft.

Example 23 is a vehicle drive system, wherein the ball terminal is truncated spherical.

Example 24 is a vehicle drive system, wherein the shaft assembly includes an end mechanically configured to couple the first drive assembly to a primary drive train of a primary-secondary drive system.

Example 25 is a vehicle drive system, wherein the primary drive train is a main drive train of a rotary aircraft.

Example 26 is a vehicle drive system, wherein the second terminal is mechanically configured to couple to a secondary drive train of a primary-secondary drive train system.

Example 27 is a vehicle drive system, wherein the secondary drive train is a drive train of a hydraulic pump for a rotary aircraft.

Example 28 is a vehicle drive system, wherein the ball terminal is dimensioned to pass through a spline receiver of a mating part.

Example 29 is a vehicle drive system, wherein the shaft assembly has a longitudinal length of greater than about 8 inches.

Example 30 is a vehicle drive system, wherein the shaft assembly has a longitudinal dimension approximately 13-14 inches.

Example 31 is a vehicle drive system, wherein the ball terminal is discrete from the shaft assembly.

Example 32 is a vehicle drive system, wherein the ball terminal is of a different material from the shaft assembly.

Example 33 is a vehicle drive system, wherein the ball terminal is constructed of a wear material.

Example 34 is a vehicle drive system, wherein the ball terminal is disposable.

Example 35 is a rotary aircraft, comprising: an airframe; an engine to drive a drive train; a rotor assembly to provide primary motive power via the drive train; a gear assembly to mechanically couple to the drive train; a hydraulic pump to distribute lubricant fluid; and a spline shaft assembly to rotatably couple the hydraulic pump to the gear assembly, the spline shaft assembly having a spherical mating member to mate with the gear assembly.

Example 36 is a rotary aircraft, wherein the hydraulic pump is located substantially in a forward portion of the gear assembly.

Example 37 is a rotary aircraft, wherein the rotary aircraft is an attack helicopter.

Example 38 is a rotary aircraft, wherein the spline shaft assembly is hollow.

Example 39 is a rotary aircraft, wherein the spline shaft assembly is solid.

Example 40 is a rotary aircraft, wherein the spherical mating member is truncated spherical.

Example 41 is a rotary aircraft, wherein the primary drive train is a main drive train of the rotary aircraft.

Example 42 is a rotary aircraft, wherein the gear assembly is mechanically configured to couple to a secondary drive train of a primary-secondary drive train system.

Example 43 is a rotary aircraft, wherein the secondary drive train is a drive train of a hydraulic pump for a rotary aircraft.

Example 44 is a rotary aircraft, wherein the spherical mating member is dimensioned to pass through a spline receiver of a mating part.

Example 45 is a rotary aircraft, wherein the spline shaft assembly has a longitudinal length of greater than about 8 inches.

Example 46 is a rotary aircraft, wherein the spline shaft assembly has a longitudinal dimension between approximately 8 and 24 inches.

Example 47 is a rotary aircraft, wherein the spherical mating member is discrete from the spline shaft assembly.

Example 48 is a rotary aircraft, wherein the spherical mating member is of a different material from the spline shaft assembly.

Example 49 is a rotary aircraft, wherein the spherical mating member is constructed of a wear material.

Example 50 is a rotary aircraft, wherein the spherical mating member is disposable.

A rotor blade assembly for the rotary aircraft of any of claims 35-50.

The diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, where operations are shown, two logical or functional blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein.

Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this specification, references to various features included in "one embodiment," "example embodiment," "an embodiment," "another embodiment," "certain embodiments," "some embodiments," "various embodiments," "other embodiments," "alternative embodiment," and the like are intended to mean that any such features are included in one or more embodiments of the present disclosure, but may or may not necessarily be combined in the same embodiments.

As used herein, unless expressly stated to the contrary, use of the phrase "at least one of," "one or more of" and "and/or" are open ended expressions that are both conjunctive and disjunctive in operation for any combination of named elements, conditions, or activities. For example, each of the expressions "at least one of X, Y and Z," "at least one of X, Y or Z," "one or more of X, Y and Z," "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first," "second," "third," etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of," "one or more of," and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A spline assembly, comprising:
a spline shaft having a first end and a second end opposite the first end, wherein the first end is splined to engage a spline receiver of a primary drive system and comprises a substantially spherical alignment head, wherein the substantially spherical alignment head comprises an expendable hydrocarbon material that is caused to melt by operation of the primary drive system over time.

2. The spline assembly of claim 1, wherein the spline shaft is hollow.

3. The spline assembly of claim 1, wherein the spline shaft is solid.

4. The spline assembly of claim 1, wherein the substantially spherical alignment head is truncated spherical.

5. The spline assembly of claim 1, wherein the first end is mechanically configured to couple to a primary drive train of a primary-secondary drive system.

6. The spline assembly of claim 1, wherein the second end is mechanically configured to couple to a secondary drive train of a primary-secondary drive train system.

7. The spline assembly of claim 1, wherein the substantially spherical alignment head is dimensioned to pass through the spline receiver.

8. The spline assembly of claim 1, wherein the spline shaft has a longitudinal length of greater than about 8 inches.

9. The spline assembly of claim 1, wherein the spline shaft has a longitudinal dimension between approximately 13-14 inches.

10. The spline assembly of claim 1, wherein the substantially spherical alignment head is of a different material from the spline shaft.

11. A spline assembly, comprising:
a spline shaft having a first end and a second end, wherein the first end is splined to engage a spline receiver of a primary drive system and comprises a substantially spherical alignment head, wherein the substantially spherical alignment head comprises an expendable hydrocarbon material that is caused to melt by operation of the primary drive system over time, wherein the melted expendable hydrocarbon material mixes with lubricant fluid of the primary drive system.

* * * * *